United States Patent
Xin-LeBlanc (10) Patent No.: US 6,972,530 B1
(45) Date of Patent: Dec. 6, 2005

(54) APPARATUS AND METHOD FOR TRANSPARENT DYNAMIC RANGE SCALING FOR OPEN LOOP LED DRIVERS

(75) Inventor: Jane Xin-LeBlanc, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/818,237

(22) Filed: Apr. 5, 2004

(51) Int. Cl.[7] .......................... H05B 37/02; G05F 1/00
(52) U.S. Cl. ...................................... 315/224; 315/291
(58) Field of Search ................ 315/291, 224, 315/302; 362/800; 327/108

(56) References Cited

U.S. PATENT DOCUMENTS

| | | | |
|---|---|---|---|
| 3,824,441 A * | 7/1974 | Heyman et al. ............... 363/37 |
| 6,313,589 B1 * | 11/2001 | Kobayashi et al. ........... 315/309 |
| 6,577,512 B2 * | 6/2003 | Tripathi et al. .......... 363/21.17 |
| 6,586,890 B2 * | 7/2003 | Min et al. ..................... 315/224 |
| 6,888,383 B1 * | 5/2005 | Fairbanks ..................... 327/124 |
| 2001/0043093 A1 * | 11/2001 | Sakura et al. ................ 327/108 |
| 2002/0158590 A1 * | 10/2002 | Saito et al. ................... 315/291 |
| 2003/0034742 A1 * | 2/2003 | Chang et al. ................. 315/224 |
| 2005/0104542 A1 * | 5/2005 | Ito et al. ....................... 315/291 |

* cited by examiner

*Primary Examiner*—Don Wong
*Assistant Examiner*—Angela M Lie
(74) *Attorney, Agent, or Firm*—Merchant & Gould P.C.; Joshua W. Korver (57) ABSTRACT

The dynamic range of a charging current in an open-loop LED driver circuit is scaled to provide a charging current within tolerance for the open-loop LED driver. The scaling of the dynamic range of the charging current is performed transparently to the user, such that user selected parameters for the open-loop LED driver remain unchanged during circuit performance.

20 Claims, 5 Drawing Sheets

APPARATUS AND METHOD FOR TRANSPARENT DYNAMIC RANGE SCALING FOR OPEN LOOP LED DRIVERS

FIELD OF THE INVENTION

The present invention relates to a system and method for transparent dynamic scaling of a current delivered to a load. More particularly, the load current is delivered by an inductor that is controlled using an open-loop boost circuit topology that is suitable for use in LED driver applications. With the described topology, the value associated with the inductor is relatively small and the boost circuit operates over a wide operating frequency range.

BACKGROUND OF THE INVENTION

Demand for portable electronic devices is increasing each year. Example portable electronic devices include: laptop computers, personal data assistants (PDAs), cellular telephones, and electronic pagers. Portable electronic devices place high importance on total weight, size, and battery life for the devices. Many portable electronic devices employ rechargeable batteries such as Nickel-Cadmium (NiCad), Nickel-Metal-Hydride (NiMHi), Lithium-Ion (Li-Ion), and Lithium-Polymer based technologies.

In many portable power applications, a voltage that exceeds the battery voltage is required to operate certain circuits such as a video display. DC—DC converters are switching-type regulators that can be used to generate higher output voltages from a battery voltage. The output voltage is typically provided to a load circuit by varying the conduction time that is associated with a controlled device. Example controlled devices include transistors, gate-turn-on (GTO devices), thyristors, diodes, as well as others. The frequency, duty cycle, and conduction time of the controlled device is varied to adjust the average output voltage to the load. Typical DC—DC converters are operated with some sort of oscillator circuit that provides a clock signal. The output voltage of the converter is also determined by the oscillation frequency associated with the clock signal.

For certain display applications, such as stacked light emitting diodes (LEDs), both designs for boosting current driven to a load are available. However, certain designs may not meet tolerances or other required parameters of operation.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to an apparatus, system and method for dynamically scaling the range of a charging current used in providing a current delivered to a load. Current may be delivered to the load using an open-loop boost circuit topology that is suitable for LED driver applications.

Figure 1:
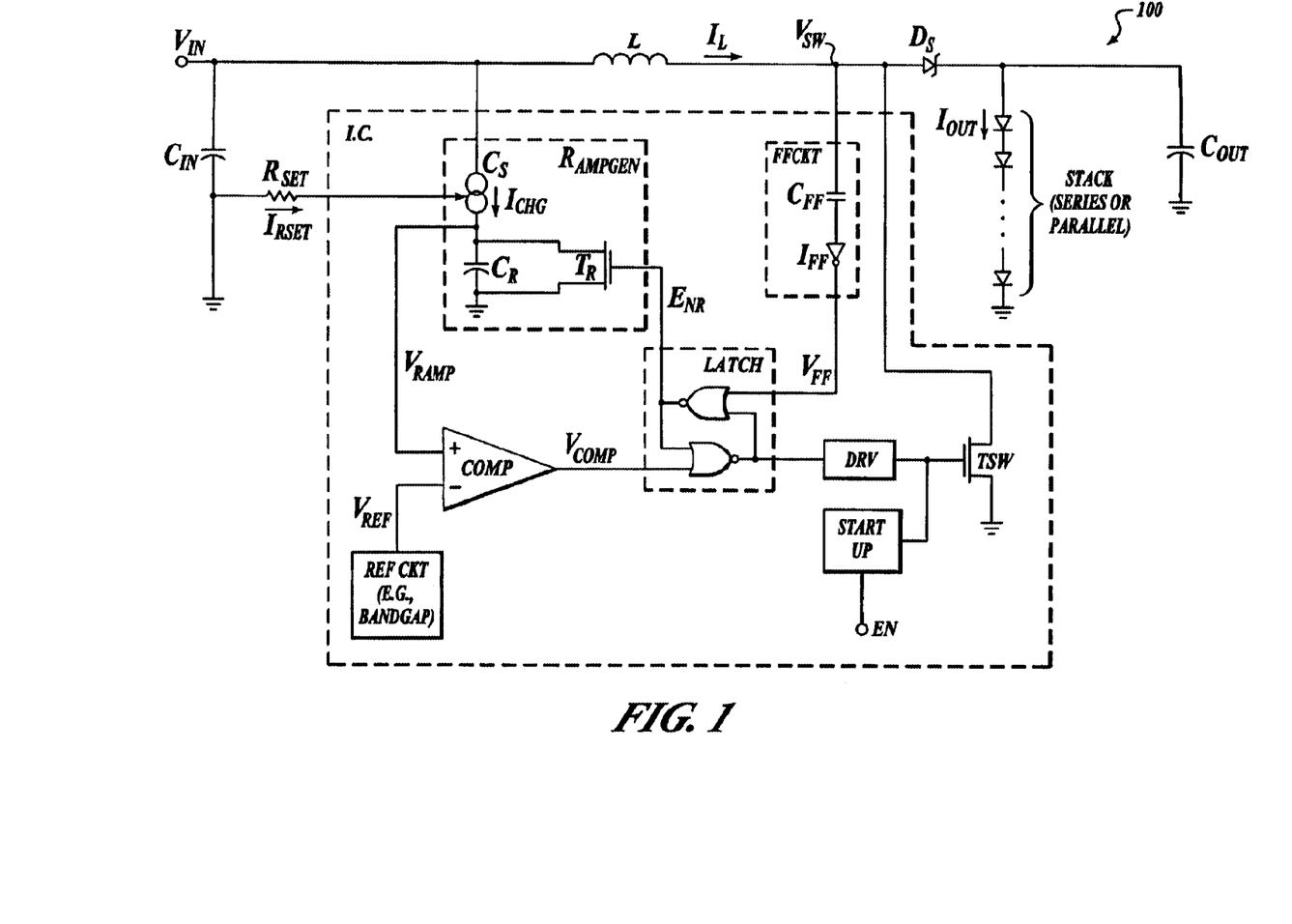
FIG. 1 is an illustration of an example open-loop boost circuit.

FIG. 1 is an illustration of an example open-loop boost circuit (100) that was provided in U.S. patent application Ser. No. 10/720,953 entitled "Open Loop Magnetic Boost LED Driver System and Method" filed Nov. 24, 2003, which is assigned to the assignee of the present patent application and hereby incorporated by reference in its entirety. The open-loop boost circuit (100) includes: two capacitors ($C_{IN}$, $C_{OUT}$), an inductor (L), a stack circuit ($D_1, D_2, \ldots, D_N$), a Schottky-type diode ($D_S$), a feed-forward circuit (FFCKT), a latch circuit (LATCH), a ramp generator circuit (RAMPGEN), a resistor ($R_{SET}$), a comparator (COMP), a reference circuit (REF CKT), a transistor switch circuit ($T_{SW}$), a driver circuit (DRV), and a start-up circuit (STARTUP).

Capacitor $C_{IN}$ is coupled between the input voltage ($V_{IN}$) and ground. Resistor $R_{SET}$ is coupled between the RAMPGEN and ground. RAMPGEN is arranged to provide a ramp voltage ($V_{RAMP}$) with a known slope when enabled. Ramp voltage $V_{RAMP}$ corresponds to ground when RAMPGEN is disabled via signal RES. REF CKT is arranged to provide a voltage reference ($V_{REF}$). Inductor L is selectively coupled to ground through transistor switch circuit $T_{SW}$ when transistor switch circuit $T_{SW}$ is active, and coupled to the stack circuit through Schottky diode $D_S$ when transistor switch circuit $T_{SW}$ is inactive. The stack circuit is coupled between Schottky diode $D_S$ and ground. Capacitor $C_{OUT}$ is coupled in parallel with the stack circuit to minimize ripple in the output voltage ($V_{OUT}$). Feed-forward circuit FFCKT is arranged to sense the voltage ($V_{SW}$) associated with the non-input side of inductor L and provides a signal to an input of latch circuit LATCH. Comparator COMP is arranged to compare ramp voltage $V_{RAMP}$ to reference voltage $V_{REF}$ and provide a comparison signal ($V_{COMP}$) to another input of latch circuit LATCH. One output of latch circuit LATCH is arranged to provide signal ENR. Another output of latch circuit LATCH is arranged to selectively activate transistor switch circuit $T_{SW}$ via driver circuit DRV and signal $V_{GATE}$. Start up circuit START UP is arranged to force signal $V_{GATE}$ during a start-up sequence (when EN is active) such that inductor L is charged and the latch is initialized to an appropriate condition via comparator COMP and the feed-forward circuit.

An example feed-forward circuit includes a capacitor ($C_{FF}$) and an inverter circuit (IFF), which are coupled between signal $V_{SW}$ and an input of the latch circuit. Changes in the signal $V_{SW}$ are detected by the capacitor and fed to the latch circuit as signal $V_{FF}$. For example, $V_{FF}$ corresponds to a low logic level until $V_{SW}$ drops below a threshold associated with inverter circuit IFF, where $V_{FF}$ pulses as a high logic pulse.

Ramp generator RAMPGEN is illustrated as a current source (CS) that has an output coupled to a capacitor ($C_R$), and an input that is coupled to resistor RSET. Transistor switching circuit $T_{SW}$ is configured to short capacitor ($C_R$) to ground when signal ENR is active such that the ramp is reset to a known value before each ramp cycle begins. Current source CS provides a current ($I_{CHG}$) to capacitor $C_R$ such that the capacitor charges at a constant rate. The charging rate is adjusted by changing the magnitude of current $I_{CHG}$, which is adjusted by resistor $R_{SET}$.

The output current ($I_{OUT}$) is adjusted by changing a value associated with resistor $R_{SET}$, which in turn adjusts the slope of ramp voltage $V_{RAMP}$. The slope of ramp voltage $V_{RAMP}$ controls the on-time ($T_{ON}$) associated with transistor switch circuit $T_{SW}$, which in turn controls the charging of inductor L. For example, comparator COMP controls the gate voltage ($V_{GATE}$) via driver circuit DRV and latch circuit LATCH such that transistor switching circuit $T_{SW}$ is disabled when the ramp voltage ($V_{RAMP}$) exceeds the reference voltage ($V_{REF}$).

In order to accommodate a wide range of input voltages, output currents and possible inductance values, the quantity $I_{CHG}$ as shown in FIG. 1 may have a very large dynamic range. The equation for $I_{CHG}$ may be described as:

$$I_{CHG}=(V_{IN}^2 * V_{REF} * C_R)/(2 \cdot L \cdot I_{OUT} \cdot V_{OUT}) \quad (1)$$

With, $V_{REF}$ and $C_R$ as constant values, $I_{CHG}$ is proportional to the following variable quantity:

$$I_{CHG}=V_{IN}^2/(I_{OUT} \cdot L \cdot V_{OUT}) \quad (2)$$

One way to characterized dynamic range is to calculate the ratio of possible maximum to minimum values. Consider the case where the circuit of FIG. 1 is designed to support an output current range of 5 mA to 65 mA, an input voltage range of 2.7V to 7.5V, and an inductance range of 1 uH to 10 uH. This makes the maximum of $I_{CHG}$ divided by the minimum of $I_{CHG}$, or $I_{CHG\_MAX}/I_{CHG\_MIN}$, equal to:

$$I_{CHG\_MAX}/I_{CHG\_MIN}=(7.5/2.7)^2 \cdot (65/5) \cdot (10/1) \cdot (14.2/9.9) \text{ or,} \quad (3)$$

$$I_{CHG\_MAX}/I_{CHG\_MIN}=1439$$

The result of equation 3 implies that if an open-loop LED driver is designed with the minimum $I_{CHG}$ to be a modest 4 uA, the maximum current would need to be (1439·4 uA) or 5.8 mA. Not only is 5.8 mA a considerable power drain, it is difficult to implement a circuit that can produce such wide dynamic ranges with high accuracy. Accuracy may be especially important in an open loop architecture, because unlike closed loop drivers where errors in control circuits are attenuated by large loop gains, any inaccuracy in open loop control contributes directly to the output error.

The method and architecture provided below in FIGS. 2–6 reduces the $I_{CHG}$ dynamic range. Furthermore, the reduction of the dynamic range is made transparent to the user such that an extra range selection input is not needed.

Figure 2:
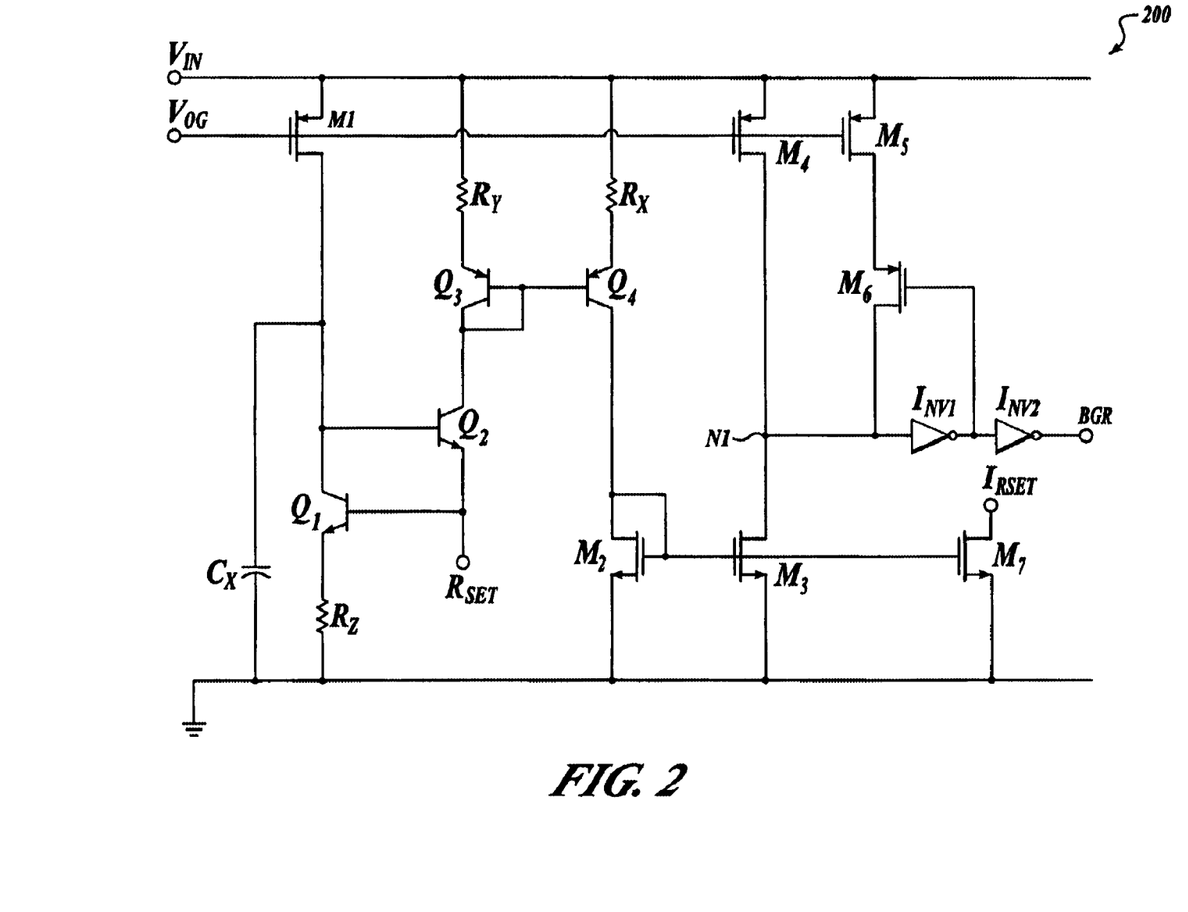
FIG. 2 is an illustration of an example circuit for providing a range selection signal.

FIG. 2 is an illustration of an example circuit for providing a range selection signal in accordance with the present invention. Selection signal circuit 200 is arranged to provide a selection signal (BGR). The selection signal (BGR) is used to select a value for capacitor $C_R$ of the open-loop LED driver circuit of FIG. 1, and to select a resistance value ($R_A$) shown in FIG. 3 that is used in producing the charge current $I_{CHG}$. The value of capacitor $C_R$ and resistance $R_A$ are selected to reduce the dynamic range for the charge current ($I_{CHG}$).

Transistors $Q_3$ and $Q_4$ with resistors Ry and Rx are arranged as in a current mirror configuration. Transistors $M_2$ and $M_3$ are also arranged in a current mirror configuration. Transistors $Q_3$, $Q_4$, $M_2$, and $M_3$ therefore have the same current ($I_{RSET}$ mirrored from transistor $M_7$) flowing through them. Accordingly, $I_{RSET}$ is also flowing through the external resistor (RSET) that is coupled to the emitter of transistor $Q_2$ and gate of transistor $Q_3$. A capacitor ($C_X$) is coupled between ground and the connection between the source of transistor M1 and the collector of transistor $Q_1$. The purpose of $C_X$ is to provide frequency compensation for the feedback loop formed by Q1 and Q2. In the embodiment shown, $I_{RSET}=V_{BG}/RSET$, Where $V_{BG}$ is a bandgap voltage. The bandgap voltage may be generated according to a bandgap reference circuit or another voltage reference may also be used.

Transistors $M_3$ and $M_4$ form a current comparator. When $I_{RSET}$ is higher than a predetermined threshold (e.g., 50 uA), node $N_1$ approaches a logic low level. Conversely, when $I_{RSET}$ is lower than the predetermined threshold (e.g., 50 uA), node $N_1$ approaches a logic high level. Inverters $INV_1$ and $INV_2$ provide extra gain to the comparator. In other embodiments, any number of inverters, including none, may be used at the output for the selection signal (BGR). Transistors $M_5$ and $M_6$ are included in the embodiment shown to provide a small positive feedback to the comparator ($M_3$ and $M_4$). The small positive feedback provides hysteresis to reduce runt pulses.

When BGR corresponds to a logic high level, a first scaling region is selected, and $C_R$ and $R_A$ are selected to have a first set of values to scale $I_{CHG}$ to an acceptable level. Correspondingly, when BGR corresponds to a logic low level, a second scaling region is selected, and $C_R$ and $R_A$ are selected to have a second set of values to scale $I_{CHG}$ to an acceptable level. Adjustment of $C_R$ and $R_A$ based upon the value of BGR is described in greater detail below with respect to FIGS. 3 and 4.

The dynamic range scaling method of the present invention utilizes the observation that $I_{CHG}$ is inversely proportional to $I_{RSET}$ (the current that flows through RSET). In the open loop architecture, RSET is chosen based on most of the dynamic range setting components that are selected for a particular application. These components are: $I_{OUT}$, L, and $V_{OUT}$. Accordingly, once an input voltage ($V_{IN}$) is also selected, the dynamic range of $I_{CHG}$ may be scaled based on $I_{RSET}$. The following equations provide the relationship between RSET, $I_{RSET}$, and $I_{CHG}$:

$$RSET = Eff \cdot Vref1 \cdot Vref2 \cdot C_R \cdot R_A^2 / (I_{OUT}^2 \cdot L \cdot V_{OUT}) \quad (4)$$

$$I_{RSET} = Vref2/RSET = 2 \cdot I_{OUT} \cdot L \cdot V_{OUT}/(Eff \cdot Vref1 \cdot C_R \cdot R_A^2) \quad (5)$$

$$I_{CHG} = (V_{IN}/R_A)^2 / I_{RSET} = V_{in}^2 \cdot RSET/(R_A^2 \cdot Vref2) \quad (6)$$

The value of RSET is a selected value that may be selected by a user according to design tolerances or other parameters. Accordingly, the value of $C_R \cdot R_A^2$ is held constant so that the user does not perceive a change in value for RSET. However, the individual values of $C_R$ and $R_A$ may be changed as long as the product of $C_R \cdot R_A^2$ is held constant. Adjusting the capacitance of $C_R$ and the resistance of $R_A$ depending on the value of $I_{RSET}$ provides scaling of the dynamic range for the charge current ($I_{CHG}$), where the scaling is performed transparent to the user.

Figure 3:
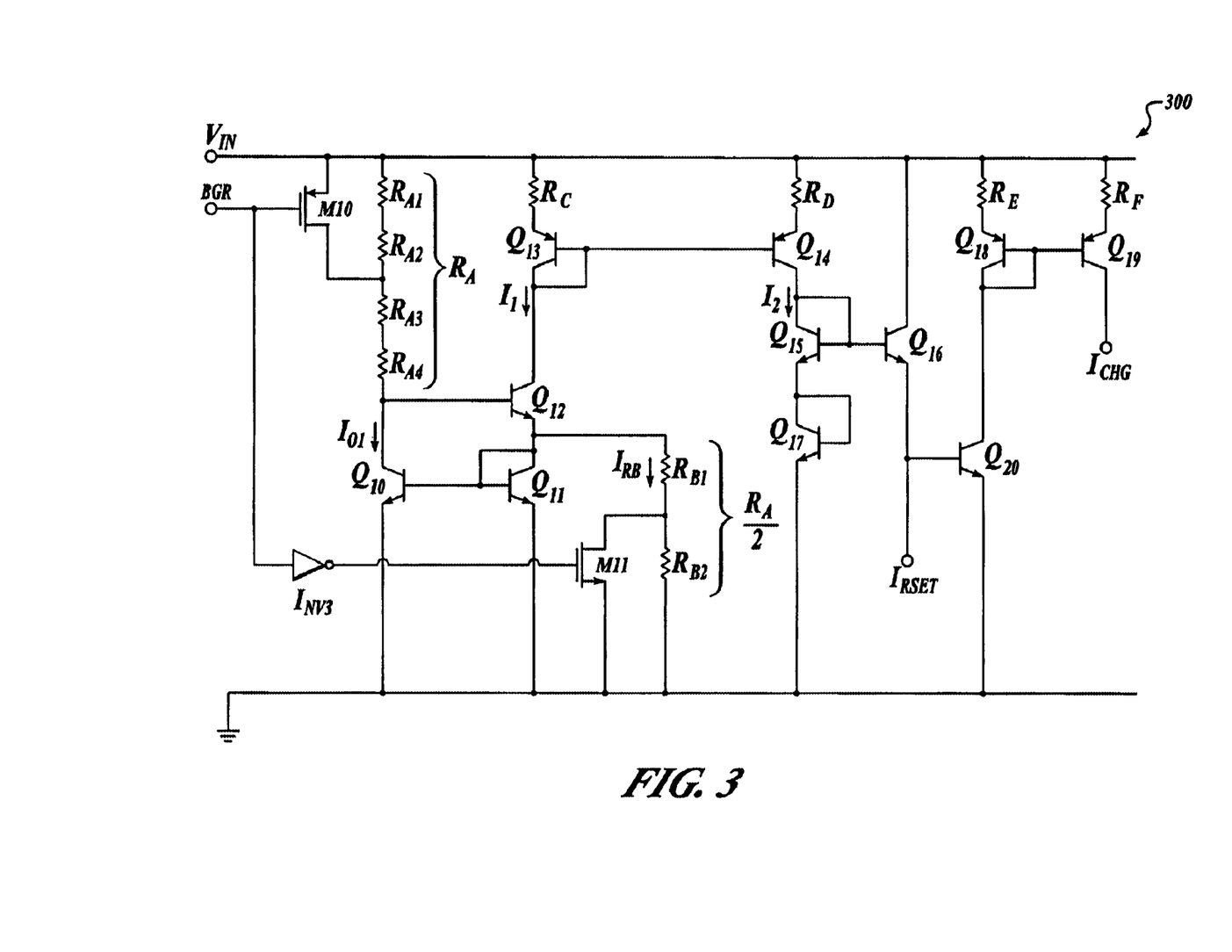
FIG. 3 is an illustration of an example circuit for using the range selection signal to generate the charge current for the open-loop boost circuit.

FIG. 3 is an illustration of an example circuit for using the range selection signal to generate the charge current for the open-loop boost circuit. Resistors $R_{A1}$, $R_{A2}$, $R_{A3}$, and $R_{A4}$ in series forms resistance circuit $R_A$, and resistors $R_{B1}$ and $R_{B2}$ in series forms resistance circuit $R_A/2$. The resistance circuits ($R_A$ and $R_A/2$) are both used in generating the charge current ($I_{CHG}$). When BGR corresponds to a logic high level, transistors M10 and M11 are both off. With transistor M10 off, resistance circuit $R_A$ corresponds the series addition of resistors $R_{A1}$, $R_{A2}$, $R_{A3}$, and $R_{A4}$. Similarly, with transistor M11 off, resistance circuit $R_A/2$ corresponds to the series addition of resistors $R_{B1}$ and $R_{B2}$. Correspondingly, when BGR corresponds to a logic low level, transistors M10 and M11 are both on. With transistor M10 on, resistance circuit $R_A$ corresponds the series addition of resistors $R_{A3}$ and $R_{A4}$. Similarly, with transistor M11 on, resistance circuit $R_A/2$ corresponds to resistor $R_{B1}$.

Transistors $Q_{11}$ and $Q_{12}$ are arranged to provide a voltage across resistance circuit $R_A$ to set the collector current ($I_{C1}$) of transistor $Q_{10}$ as: $I_{C1} = (V_{IN} - 2V_{BE})/R_A$. Transistors $Q_{10}$ and $Q_{11}$ are arranged in a current mirror configuration such that they have substantially the same collector current. Resistance circuit $R_A/2$ is arranged in parallel with transistor $Q_{11}$ such that the current through resistor $R_A/2$ corresponds to $I_{RB} = 2V_{BE}/R_A$. The resulting collector current through transistor $Q_{13}$ corresponds to $V_{IN}/R_A$.

Transistors $Q_{13}$ and $Q_{14}$ with resistors $R_C$ and $R_D$ are arranged in a current mirror configuration such that their collector currents are ratio matched ($X \cdot I_1 = I_2$), where collector current $I_1$ is given by $I_1 = I_Q = V_{IN}/R$. Transistors $Q_{15}$ and $Q_{17}$ are arranged to operate as diodes that are biased by current $I_2 = X \cdot V_{IN}/R$.

The current ($I_{RSET}$) through the external resistor (RSET) is coupled to the emitter of transistor $Q_{16}$ and the base of transistor $Q_{20}$. Since transistor $Q_{16}$ has a collector current of $I_2$ and an emitter current of $I_{RSET}$, the base current to transistor $Q_{20}$ corresponds to ($I_2 - I_{RSET}$), resulting in a collector current for transistor $Q_{20}$ that is proportional to $I_2^2/I_{RSET}$. Transistors $Q_{18}$ and $Q_{19}$ with resistors $R_E$ and $R_F$ are arranged in a current mirror configuration such that their collector currents are ratio matched. The resulting current at the collector of transistor $Q_{19}$ corresponds to $I_{CHG} = I_2^2/I_{RSET}$. Since $I_2$ is proportional to $V_{IN}/R_A$, then $I_{CHG}$ is proportional to the ratio: $(V_{IN}/R_A)^2/(R_{SET})$ as described in Equation 6 above.

Figure 4:
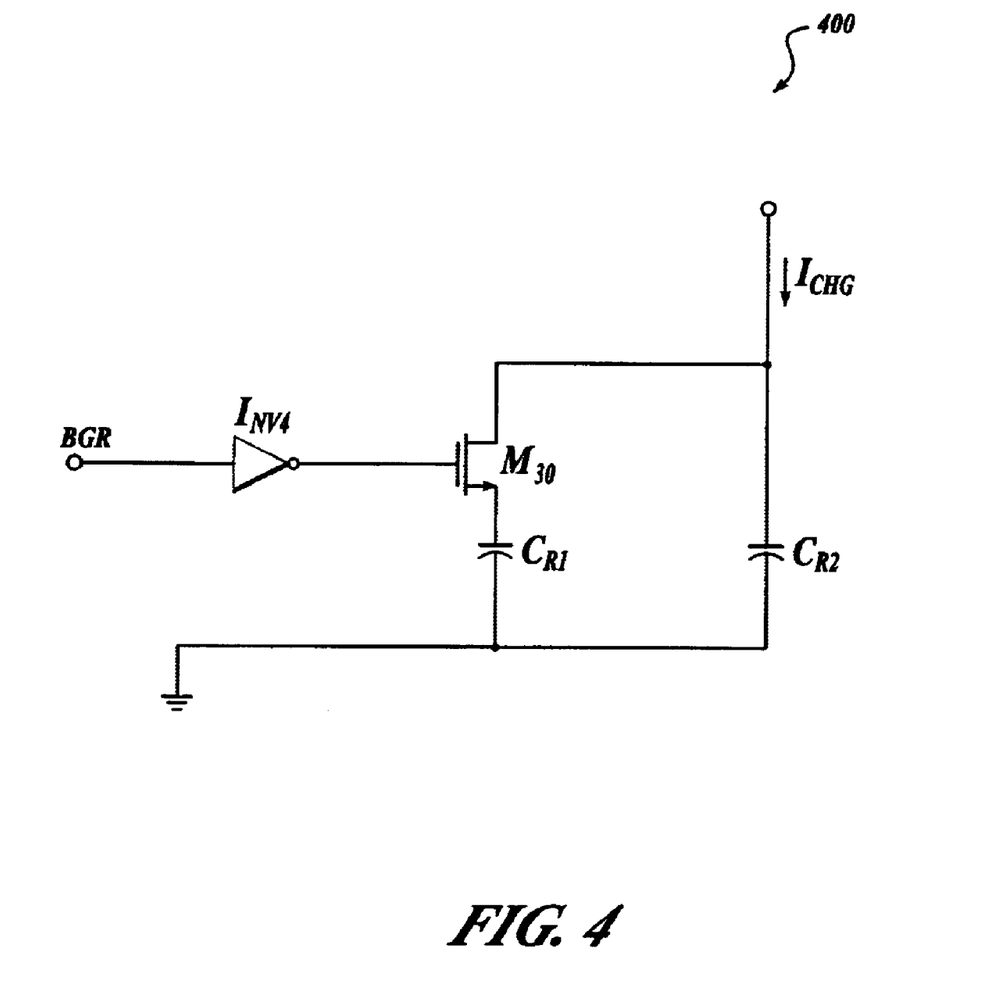
FIG. 4 is an illustration of an example circuit for changing the capacitance value of $C_R$ shown in FIG. 1 according to the range selection signal.

FIG. 4 is an illustration of an example circuit for changing the capacitance value of $C_R$ shown in FIG. 1 according to the range selection signal, in accordance with the present invention.

As previously stated, the product of $C_R \cdot R_A^2$ is held substantially constant such that $C_R$ and $R_A$ may be adjusted to select the dynamic range of the charging current ($I_{RSET}$) without being reflected in the expected output of the open-loop LED driver. The resistance of $R_A$ is selected in response to the selection signal (BGR). The capacitance of $C_R$ is also selected in response to the selection signal (BGR) and corresponds to $R_A$.

In the embodiment shown, an inverter ($INV_4$) inverts the selection signal to activate and deactivate a transistor ($M_{30}$). Transistor $M_{30}$ acts as a switch, to include or remove capacitor $C_{R1}$ in parallel with capacitor $C_{R2}$. When the selection signal (BGR) corresponds to a low logic level, transistor $M_{30}$ is off and the value capacitance circuit $C_R$ in FIG. 1 corresponds to the value of capacitor $C_{R2}$. Similarly, when the selection signal (BGR) corresponds to a high logic level, transistor $M_{30}$ is on, and the value capacitance circuit $C_R$ corresponds to the value of capacitors $C_{R1}$ and $C_{R2}$ in parallel.

In an alternative embodiment, an additional switch circuit responsive to the selection circuit may be included to switch between two or more capacitors rather than accumulating or removing capacitors in parallel.

Figure 5:
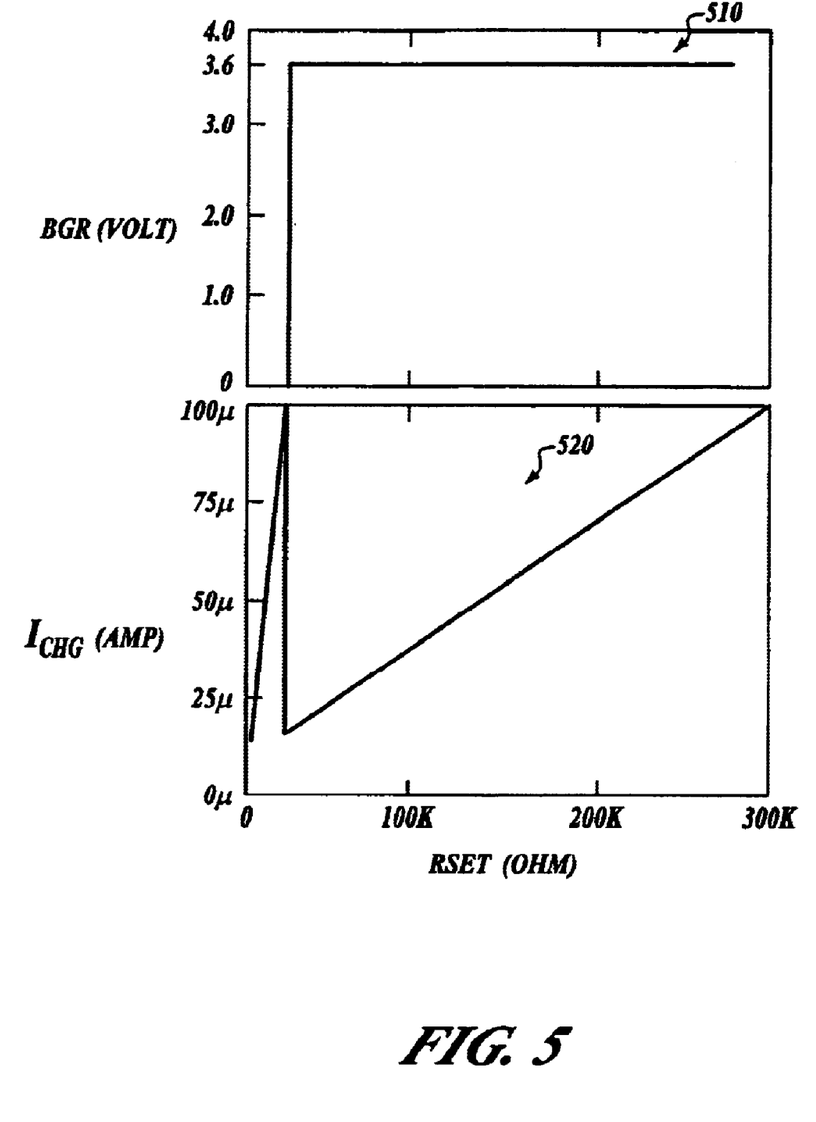
FIG. 5 is an illustration of example signal waveforms for the circuits illustrated in FIGS. 2–4, arranged in accordance with the present invention.

FIG. 5 is an illustration of example signal waveforms for the circuits illustrated in FIGS. 2–4, in accordance with the present invention. Illustrated is a plot (510) of the selection signal (BGR), and a plot (520) of $I_{CHG}$ vs. RSET for the corresponding values of BGR, with $V_{IN}$ set to 3.6V. The x-axis for both plots is the RSET resistance value. RSET ranges from 1 kOhm to 300 kOhm. The y-axis of the first plot (510) corresponds to the range selection signal (BGR). It switches from logic low to logic high when RSET is at about 22 kOhms. The y-axis of the second plot is $I_{CHG}$. As indicated in Equation (6), $I_{CHG}$ is linearly proportional to RSET, and it has a slope of $[V_{IN}^2/(R_A^2 \cdot Vref2)]$. In this example, when BGR=0, $R_A$=48 kOhm and the open-loop LED driver is in region 2. When BGR=1, $R_A$=180 kOhm and the open-loop LED driver is in region 1. The different $R_A$ values produce different $I_{CHG}$ slopes in the two regions, as expected. But the dynamic ranges for the charging current ($I_{CHG}$) in both regions are designed to be about equal (e.g., between 10 uA and 100 uA).

As an example of the dynamic range scaling provided by the present invention, let:
$C_{RX} \cdot R_{AX}^2 = C_{RZ} \cdot R_{AZ}^2 = $ constant $=0.02$;
Vref1=Vref2=1.2V; and
    For $I_{RSET} < 55$ uA (region 1):
        $R_{AX}=R_{AZ}=180$ kOhm, and
        $C_{RX}=C_{RZ}=0.62$ pF.
    Else (region 2):
        $R_{AX}=R_{AZ}=48$ kOhm, and
        $C_{RX}=C_{RZ}=8.68$ pF.

Substituting the above values into Equations (5) and (6) above and assuming Eff is unity, the resulting calculations provide For region 1:
    $I_{RSET\_MIN}=(2 \cdot 5$ mA$\cdot 1$ uH$\cdot 9.9$V$)/(1.2$V$\cdot 0.02)=4.1$ uA;
    $I_{RSET\_MAX}=55$ uA;
        $I_{CHG\_MIN}=(2.7$V$/180$ k$)^2/55$ uA$=4.1$ uA; and
        $I_{CHG\_MAX}=(7.5$V$/180$ k$)^2/4.1$ uA$=423$ uA.
For region 2:
    $I_{RSET\_MIN}=55$ uA;
    $I_{RSET\_MAX}=(2 \cdot 65$ mA$\cdot 10$ uH$\cdot 14.2$V$)/(1.2$V$\cdot 0.02)=769$ uA;
        $I_{CHG\_MIN}=(2.7$V$/48$ k$)^2/769$ uA$=4.1$ uA; and
        $I_{CHG\_MAX}=(7.5$V$/48$ k$)^2/55$ uA$=443$ uA.

As a result of the scaling in the above example, the dynamic range of $I_{CHG}$ in both regions 1 and 2 is reduced by a considerable factor when compared to an un-scaled dynamic range as shown in equation 3. Also because the product $C_R \cdot R_A^2$ is kept relatively constant, the user can choose RSET based on a single formula (e.g., equation 4). Also, even though in the example above, only two dynamic range regions were chosen, the same method may be extended to create more than two dynamic range regions as desired.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for adjusting the dynamic range of a charging current within an open-loop LED driver circuit, the apparatus, comprising:
    a selection signal circuit that is arranged to produce a selection signal, wherein the selection signal corresponds to a logic low level during a first region and the selection signal corresponds to a logic high level during a second region;
    a charge current circuit that is arranged to produce the charge current in response to the selection signal, wherein a resistance circuit is selected to have a first resistance during the first region and a second resistance during the second region; and
    a selected capacitance circuit that is arranged to select a first capacitance during the first region in response to the selection signal and is arranged to select a second capacitance during the second region in response to the selection signal, wherein selecting the first capacitance and first resistance transparently reduces the dynamic range of the charging current during the first region, and selecting the second capacitance and second resistance transparently reduces the dynamic range of the charging current during the second region.

2. The apparatus of claim 1, wherein the resistance circuit corresponds to resistors coupled in series, wherein at least one of the resistors is coupled within a current path in response to the selection signal.

3. The apparatus of claim 1, wherein the charge current circuit further comprises another resistance circuit that is half the first resistance during the first region and half the second resistance during the second region.

4. The apparatus of claim 1, wherein an external resistor of the open-loop LED driver circuit is selectable by a user without the dynamic range of the charging current exceeding tolerances for the open-loop LED driver circuit.

5. The apparatus of claim 4, wherein the selection signal circuit is further arranged such that the selection signal switches between a low logic level and a high logic level in response to a current measured across the external resistor passing a specified threshold level.

6. The apparatus of claim 1, wherein the selected capacitance circuit is further arranged such that the first capacitance corresponds to a first capacitor and the second capacitance corresponds to the first capacitor in parallel with a second capacitor.

7. The apparatus of claim 1, wherein the selected capacitance circuit is further arranged such that the first capacitance corresponds to a first capacitor and the second capacitance corresponds to a second capacitor.

8. The apparatus of claim 1, wherein the charge current circuit is further arranged such that the charge current is linearly proportional to a resistance of an external resistor of the open-loop LED driver circuit.

9. The apparatus of claim 1, wherein a product of the first resistance and the first capacitance of the first region is held substantially constant.

10. The apparatus of claim 9, wherein a product of the second resistance and the second capacitance of the second region is held substantially constant.

11. The apparatus of claim 1, wherein the charge current circuit is further arranged such that the charge current is inversely proportional to a current measured across an external resistor of the open-loop LED driver circuit.

12. A method for reducing the dynamic range of a charging current within an open-loop LED driver circuit, the method comprising:
    producing a selection signal, wherein the selection signal corresponds to a logic low level during a first region and the selection signal corresponds to a logic high level during a second region;
    producing the charge current in response to the selection signal, wherein a first resistance is selected during the first region and a second resistance is selected during the second region;
    selecting a first capacitance during the first region in response to the selection signal; and
    selecting a second capacitance during the second region in response to the selection signal, wherein the first capacitance and first resistance are selected such that the dynamic range of the charging current is transparently reduced during the first region, and the second capacitance and second resistance are selected such that the dynamic range of the charging current is transparently reduced during the second region.

13. The method of claim 12, further comprising selecting an external resistor of the open-loop LED driver circuit without the dynamic range of the charging current exceeding tolerances for the open-loop LED driver circuit.

14. The method of claim 13, further comprising switching the selection signal between a low logic level and a high logic level in response to a current measured across the external resistor passing a specified threshold level.

15. The method of claim 12, wherein the first capacitance corresponds to a first capacitor and the second capacitance corresponds to the first capacitor in parallel with a second capacitor.

16. The method of claim 12, wherein the first capacitance corresponds to a first capacitor and the second capacitance corresponds to a second capacitor.

17. The method of claim 12, wherein the charge current is linearly proportional to a resistance of an external resistor of the open-loop LED driver circuit.

18. The method of claim 12, wherein the charge current is inversely proportional to a current measured across an external resistor of the open-loop LED driver circuit.

19. An apparatus for reducing the dynamic range of a charging current within an open-loop LED driver circuit, the apparatus comprising:
    means for producing a selection signal, wherein the selection signal corresponds to a logic low level during a first region and the selection signal corresponds to a logic high level during a second region;
    means for producing the charge current in response to the selection signal, wherein a first resistance is selected during the first region and a second resistance is selected during the second region; and
    means for selecting a first capacitance during the first region in response to the selection signal and selecting a second capacitance during the second region in response to the selection signal, wherein the first capacitance and first resistance are selected such that the dynamic range of the charging current is transparently reduced during the first region, and the second capacitance and second resistance are selected such that the dynamic range of the charging current is transparently reduced during the second region.

20. The apparatus of claim 19, wherein the charge current is inversely proportional to a current measured across an external resistance means of the open-loop LED driver circuit.

* * * * *

UNITED STATES PATENT AND TRADEMARK OFFICE
CERTIFICATE OF CORRECTION

PATENT NO. : 6,972,530 B1 Page 1 of 1
APPLICATION NO. : 10/818237
DATED : December 6, 2005
INVENTOR(S) : Jane Xin-LeBlanc It is certified that error appears in the above-identified patent and that said Letters Patent is hereby corrected as shown below:

Column 6, Line 32, change "slop" to --slope--.

Signed and Sealed this

Fourth Day of July, 2006

JON W. DUDAS
*Director of the United States Patent and Trademark Office*